No. 731,565. PATENTED JUNE 23, 1903.
W. R. HANEY.
ENGINE.
APPLICATION FILED DEC. 26, 1902.
NO MODEL. 2 SHEETS—SHEET 2.

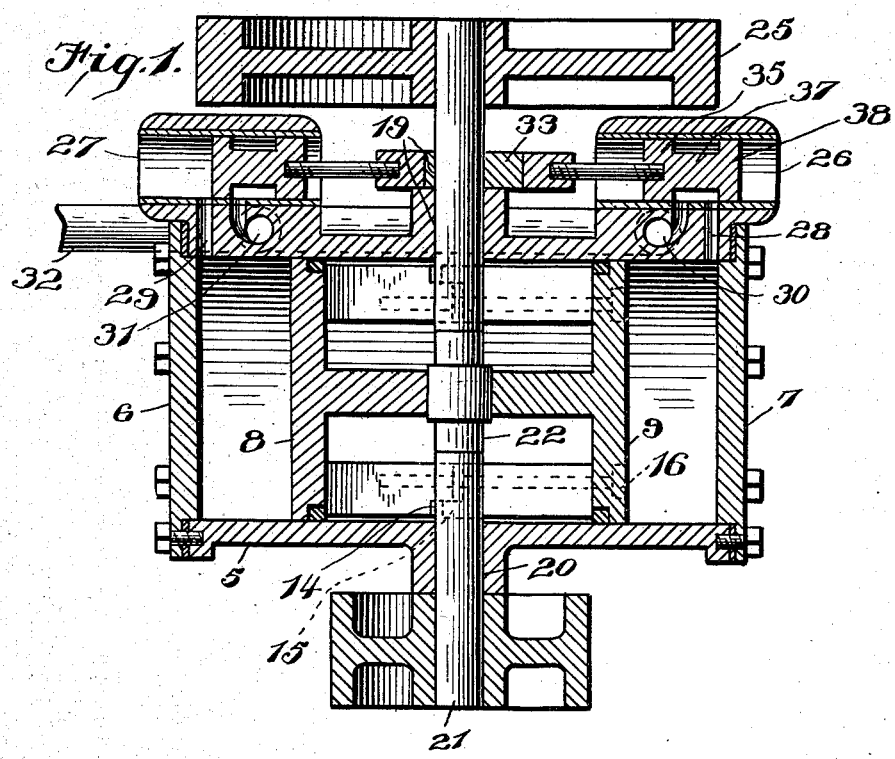
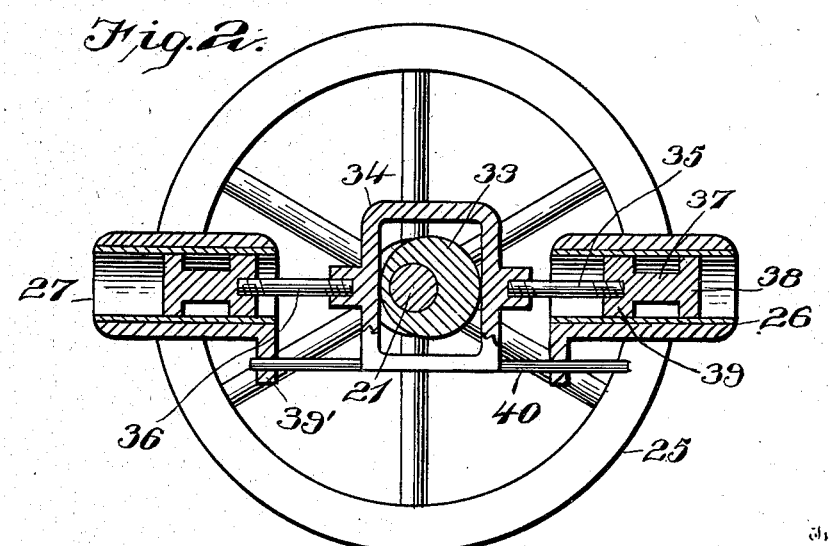

Witnesses
T. P. Brett
Harry Ellis Chandler

Inventor
W. R. Haney,
By Chandler & Chandler
Attorneys

No. 731,565.

Patented June 23, 1903.

UNITED STATES PATENT OFFICE.

WALTER R. HANEY, OF BENTON HARBOR, MICHIGAN.

ENGINE.

SPECIFICATION forming part of Letters Patent No. 731,565, dated June 23, 1903.

Application filed December 26, 1902. Serial No. 136,702. (No model.)

*To all whom it may concern:*

Be it known that I, WALTER R. HANEY, a citizen of the United States, residing at Benton Harbor, in the county of Berrien, State of Michigan, have invented certain new and useful Improvements in Engines; and I do hereby declare the following to be a full, clear, and exact description of the invention, such as will enable others skilled in the art to which it appertains to make and use the same.

This invention relates to reciprocatory steam-engines; and it has for its object to provide a construction wherein the usual piston-rod and pitman exterior to the cylinder will be omitted, the mechanism connecting the piston with the crank-shaft being located wholly within the cylinder.

A further object of the invention is to provide a specific construction of piston which will permit of ready connection and removal and easy adjustment for wear, other objects and advantages of the invention having reference to details of structure, which will be understood from the following description.

Figure 3:
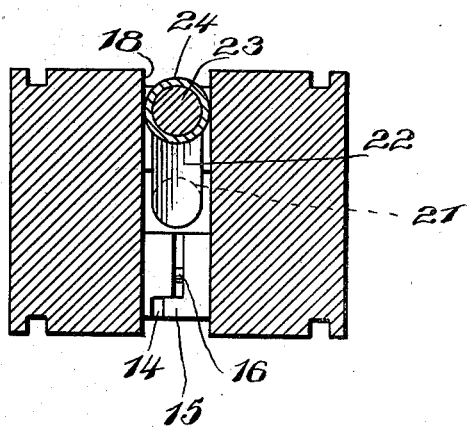
Figure 4:
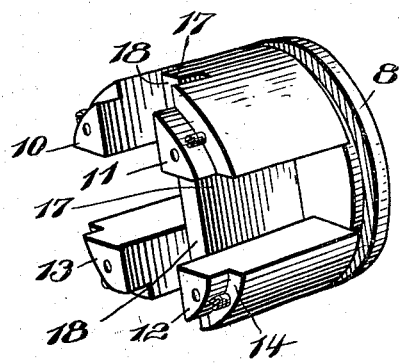

In the drawings forming a portion of this specification, and in which like numerals of reference indicate similar parts in the several views, Figure 1 is a section taken longitudinally of the engine in a plane including the axis of the crank-shaft. Fig. 2 is a section at right angles to the crank-shaft and including the cut-off mechanism. Fig. 3 is a longitudinal section of the piston, the position of the crank-shaft being indicated in dotted lines.
Fig. 4 is a detail perspective view of one section of the piston.

Referring now to the drawings, there is shown an engine comprising a cylinder 5, having the usual removable heads 6 and 7, and within which cylinder is a piston comprising separate members 8 and 9. The members of the piston consist each of a disk, from one face of which project four legs 10, 11, 12, and 13, the legs of one member of the piston having recesses 14 in their ends to receive the projections 15 of the legs of the other member, so that the ends of the legs are interlocked to prevent lateral displacement of either member with respect to each other.
To hold the members of the piston together, screws or bolts 16 are engaged through openings formed longitudinally through the members of the piston, said openings passing through the legs above referred to.

Intermediate of the pairs of legs 10 and 11 and 12 and 13 is a transverse web 17, having a flat wear-face 18 intersecting the axis of the piston at right angles, the wear-faces of the webs of the two sections or members of the piston being parallel, as shown, and by placing washers of different thicknesses between the ends of the legs of the members the wear-faces of the webs may be adjusted toward or away from each other.

Midway of the ends of the cylinder 5 are formed transversely-alining bearings 19 and 20, in which is disposed the engine-shaft 21, having a crank 22 within the cylinder, and upon the crank-pin 23 of which is mounted the friction-roller 24, which fits snugly between the wear-faces 18 of the sections of the piston, so that as the piston is reciprocated in the cylinder the wear-faces 18 will alternately press against the friction-roller and through the medium thereof move the crank to rotate the shaft, it being noted that the crank-shaft has a fly-wheel 25 to carry the engine over its dead-center. At one side of the cylinder are formed the cylindrical steam-chests 26 and 27, which communicate with the ends of the cylinder through the ports 28 and 29, and into which chests lead also ports 30 and 31, with which is connected the feed or supply pipe 32.

Upon the engine-shaft is mounted an eccentric wheel or disk 33, which lies within the inclosure of an elliptical strap 34, to which are connected the eccentric-rods 35 and 36, which extend into the steam-chests and are connected with the cut-off valves. Each of the cut-off valves consists of a central reduced body portion 37, at the ends of which are the flanges 38 and 39, which fit snugly and slidably in the steam-chests and are so spaced with relation to the eccentric and the corresponding ports that when the eccentric-strap is at one limit of its movement the ports 28 and 30 will be placed in communication through the space between the flanges 38 and 39, while the flange 38 of the chest 27 will lie between the ports 29 and 31 to permit of exhaust of the corresponding end of the cylinder, it being understood that the eccentric is set upon the shaft to insure feeding and exhausting at the ends of the cylinder when the pistons are in proper positions. Upon the steam-chests are mounted guides 39', in which operate the ends of the rod 40, secured to the eccentric-strap to prevent lateral displacement of the latter.

It will be understood that in practice modifications of the specific construction shown may be made and that any suitable materials and proportions may be used for the various parts without departing from the spirit of the invention.

What is claimed is—

1. An engine comprising a cylinder, a crank-shaft mounted transversely of the cylinder and having a crank lying within the cylinder, a piston including separate members disposed within the cylinder at opposite sides of the crank and having transverse wear-faces embracing the crank, said members of the piston having guide-slots at right angles to the wear-faces in which the shaft is received at opposite sides of its crank portion to hold the piston against rotation in the cylinder, said members having longitudinal projections having their ends halved and overlapped, bolts passed longitudinally through the members, and their projections, and screws adjustably engaged in the ends of the longitudinal projections of one of the members to hold the wear-faces in proper spaced relation.

2. An engine comprising a cylinder, a crank-shaft mounted transversely of the cylinder and having a crank lying within the cylinder, a piston including separate members disposed within the cylinder at opposite sides of the crank and having transverse wear-faces embracing the crank, said members of the piston having guide-slots at right angles to the wear-faces and in which slots the shaft is received at opposite sides of its crank portion to hold the piston against rotation in the cylinder, and means engaged with the members of the piston for holding them with their wear-faces in operative relation to the crank.

3. An engine comprising a cylinder, a shaft mounted transversely of the cylinder and having a crank lying therein, a piston including separate members disposed within the cylinder at opposite sides of the crank and having transverse wear-faces embracing the crank, said members having guide-slots at right angles to the wear-faces and in which slots the shaft is received at opposite sides of its crank portion to hold the piston against rotation, means for holding said members with their wear-faces in operative relation to the crank, steam-chests at the ends of the cylinder, inlet-ports leading to the chests, and having a feed-pipe connected thereto, ports connecting the chests with the corresponding ends of the cylinder, a valve in each chest, an eccentric upon the shaft, an elongated rectangular strap engaged with the eccentric, rods connected with the strap and with the valves for operating them, guides carried by the chests, and a rod parallel with the eccentric-rods attached to the strap and slidably engaged in the guides.

In testimony whereof I affix my signature in presence of two witnesses.

W. R. HANEY.

Witnesses:
   FRANK E. SHEARS,
   BERT HANEY.